United States Patent
Joshi et al.

(10) Patent No.: US 7,558,818 B2
(45) Date of Patent: Jul. 7, 2009

(54) SYSTEM AND METHOD FOR CHARACTERIZING THE QUALITY OF A LINK IN A WIRELESS NETWORK

(75) Inventors: Avinash Joshi, Orlando, FL (US); Guénaël T. Strutt, Sanford, FL (US)

(73) Assignee: MeshNetworks, Inc., Maitland, FL (US)

( * ) Notice: Subject to any disclaimer, the term of this patent is extended or adjusted under 35 U.S.C. 154(b) by 147 days.

(21) Appl. No.: 10/863,534

(22) Filed: Jun. 7, 2004

(65) Prior Publication Data

US 2004/0246935 A1    Dec. 9, 2004

Related U.S. Application Data

(60) Provisional application No. 60/546,941, filed on Feb. 24, 2004, provisional application No. 60/546,940, filed on Feb. 24, 2004, provisional application No. 60/476,237, filed on Jun. 6, 2003.

(51) Int. Cl.
  *G06F 15/16* (2006.01)
  *G06F 15/173* (2006.01)

(52) U.S. Cl. ............ 709/200; 709/224; 709/232; 709/233; 709/234; 709/235

(58) Field of Classification Search ............ 709/203, 709/217–220, 224, 227; 370/252, 430; 455/16, 455/41, 13.4, 450, 522
See application file for complete search history.

(56) References Cited

U.S. PATENT DOCUMENTS

| | | | |
|---|---|---|---|
| 4,494,192 A | 1/1985 | Lew et al. | |
| 4,617,656 A | 10/1986 | Kobayashi et al. | |
| 4,736,371 A | 4/1988 | Tejima et al. | |
| 4,742,357 A | 5/1988 | Rackley | |
| 4,747,130 A | 5/1988 | Ho | |
| 4,910,521 A | 3/1990 | Mellon | |
| 5,034,961 A | 7/1991 | Adams | |
| 5,068,916 A | 11/1991 | Harrison et al. | |
| 5,231,634 A | 7/1993 | Giles et al. | |

(Continued)

FOREIGN PATENT DOCUMENTS

CA    2132180    3/1996

(Continued)

OTHER PUBLICATIONS

Translation of DE 4437417.*

(Continued)

*Primary Examiner*—Kenny S Lin
*Assistant Examiner*—Angela Widhalm
(74) *Attorney, Agent, or Firm*—Randi L. Karpinia; Joseph J. Buczynski

(57) ABSTRACT

A system and method for characterizing the quality of a link, in particular, a bi-directional link, between nodes in a wireless communication network, such as a wireless ad-hoc peer-to-peer network, with minimum network overhead. The system and method determine the quality of link between two nodes by taking into consideration the view from both the nodes, and factors such as signal strength, signal-to-noise ratio or any statistic collected at the physical layer that is deemed representative of the quality of a link. The link quality can also be adjusted using a weighting factor.

10 Claims, 4 Drawing Sheets

U.S. PATENT DOCUMENTS

| | | | |
|---|---|---|---|
| 5,233,604 A | 8/1993 | Ahmadi et al. | |
| 5,241,542 A | 8/1993 | Natarajan et al. | |
| 5,317,566 A | 5/1994 | Joshi | |
| 5,392,450 A | 2/1995 | Nossen | |
| 5,412,654 A | 5/1995 | Perkins | |
| 5,424,747 A | 6/1995 | Chazelas | |
| 5,469,471 A * | 11/1995 | Wheatley, III | 370/335 |
| 5,502,722 A | 3/1996 | Fulghum | |
| 5,517,491 A | 5/1996 | Nanni et al. | |
| 5,555,425 A | 9/1996 | Zeller et al. | |
| 5,555,540 A | 9/1996 | Radke | |
| 5,572,528 A | 11/1996 | Shuen | |
| 5,615,212 A | 3/1997 | Ruszczyk et al. | |
| 5,618,045 A | 4/1997 | Kagan et al. | |
| 5,621,732 A | 4/1997 | Osawa | |
| 5,623,495 A | 4/1997 | Eng et al. | |
| 5,627,976 A | 5/1997 | McFarland et al. | |
| 5,631,897 A | 5/1997 | Pacheco et al. | |
| 5,644,576 A | 7/1997 | Bauchot et al. | |
| 5,652,751 A | 7/1997 | Sharony | |
| 5,680,392 A | 10/1997 | Semaan | |
| 5,684,794 A | 11/1997 | Lopez et al. | |
| 5,687,194 A | 11/1997 | Paneth et al. | |
| 5,696,903 A | 12/1997 | Mahany | |
| 5,701,294 A | 12/1997 | Ward et al. | |
| 5,706,428 A | 1/1998 | Boer et al. | |
| 5,717,689 A | 2/1998 | Ayanoglu | |
| 5,745,483 A | 4/1998 | Nakagawa et al. | |
| 5,768,684 A * | 6/1998 | Grubb et al. | 455/13.4 |
| 5,774,876 A | 6/1998 | Woolley et al. | |
| 5,781,540 A | 7/1998 | Malcolm et al. | |
| 5,787,080 A | 7/1998 | Hulyalkar et al. | |
| 5,794,154 A | 8/1998 | Bar-On et al. | |
| 5,796,732 A | 8/1998 | Mazzola et al. | |
| 5,796,741 A | 8/1998 | Saito et al. | |
| 5,805,593 A | 9/1998 | Busche | |
| 5,805,842 A | 9/1998 | Nagaraj et al. | |
| 5,805,977 A | 9/1998 | Hill et al. | |
| 5,809,518 A | 9/1998 | Lee | |
| 5,822,309 A | 10/1998 | Ayanoglu et al. | |
| 5,844,905 A | 12/1998 | McKay et al. | |
| 5,845,097 A | 12/1998 | Kang et al. | |
| 5,857,084 A | 1/1999 | Klein | |
| 5,870,350 A | 2/1999 | Bertin et al. | |
| 5,877,724 A | 3/1999 | Davis | |
| 5,881,095 A | 3/1999 | Cadd | |
| 5,881,372 A | 3/1999 | Kruys | |
| 5,886,992 A | 3/1999 | Raatikainen et al. | |
| 5,896,561 A | 4/1999 | Schrader et al. | |
| 5,903,559 A | 5/1999 | Acharya et al. | |
| 5,909,651 A | 6/1999 | Chander et al. | |
| 5,936,953 A | 8/1999 | Simmons | |
| 5,943,322 A | 8/1999 | Mayer et al. | |
| 5,987,011 A | 11/1999 | Toh | |
| 5,987,033 A | 11/1999 | Boer et al. | |
| 5,991,279 A | 11/1999 | Haugli et al. | |
| 6,028,853 A | 2/2000 | Haartsen | |
| 6,029,217 A | 2/2000 | Arimilli et al. | |
| 6,034,542 A | 3/2000 | Ridgeway | |
| 6,044,062 A | 3/2000 | Brownrigg et al. | |
| 6,047,330 A | 4/2000 | Stracke, Jr. | |
| 6,052,594 A | 4/2000 | Chuang et al. | |
| 6,052,752 A | 4/2000 | Kwon | |
| 6,064,626 A | 5/2000 | Stevens | |
| 6,067,291 A | 5/2000 | Kamerman et al. | |
| 6,067,297 A | 5/2000 | Beach | |
| 6,078,566 A | 6/2000 | Kikinis | |
| 6,104,712 A | 8/2000 | Robert et al. | |
| 6,108,738 A | 8/2000 | Chambers et al. | |
| 6,115,580 A | 9/2000 | Chuprun et al. | |
| 6,122,690 A | 9/2000 | Nannetti et al. | |
| 6,130,881 A | 10/2000 | Stiller et al. | |
| 6,132,306 A | 10/2000 | Trompower | |
| 6,147,975 A | 11/2000 | Bowman-Amuah | |
| 6,154,659 A * | 11/2000 | Jalali et al. | 455/522 |
| 6,163,699 A | 12/2000 | Naor et al. | |
| 6,178,337 B1 | 1/2001 | Spartz et al. | |
| 6,192,053 B1 | 2/2001 | Angelico et al. | |
| 6,192,230 B1 | 2/2001 | Van Bokhorst et al. | |
| 6,208,870 B1 | 3/2001 | Lorello et al. | |
| 6,222,463 B1 | 4/2001 | Rai | |
| 6,222,504 B1 | 4/2001 | Oby | |
| 6,223,240 B1 | 4/2001 | Odenwald et al. | |
| 6,240,294 B1 | 5/2001 | Hamilton et al. | |
| 6,246,875 B1 | 6/2001 | Seazholtz et al. | |
| 6,249,516 B1 | 6/2001 | Brownrigg et al. | |
| 6,249,682 B1 * | 6/2001 | Kubo et al. | 455/522 |
| 6,275,707 B1 | 8/2001 | Reed et al. | |
| 6,285,892 B1 | 9/2001 | Hulyalkar | |
| 6,304,556 B1 | 10/2001 | Haas | |
| 6,327,300 B1 | 12/2001 | Souissi et al. | |
| 6,330,462 B1 * | 12/2001 | Chen | 455/572 |
| 6,349,091 B1 | 2/2002 | Li | |
| 6,349,210 B1 | 2/2002 | Li | |
| 6,351,651 B1 * | 2/2002 | Hamabe et al. | 455/522 |
| 6,359,872 B1 | 3/2002 | Mahany et al. | |
| 6,366,568 B1 | 4/2002 | Bolgiano et al. | |
| 6,405,049 B2 | 6/2002 | Herrod et al. | |
| 6,507,740 B2 * | 1/2003 | Shi | 455/437 |
| 6,522,881 B1 * | 2/2003 | Feder et al. | 455/437 |
| 6,741,861 B2 * | 5/2004 | Bender et al. | 455/450 |
| 6,744,875 B1 * | 6/2004 | Wehrend et al. | 379/229 |
| 6,751,196 B1 * | 6/2004 | Hulyalkar et al. | 370/252 |
| 6,754,506 B2 * | 6/2004 | Chang et al. | 455/522 |
| 6,847,997 B1 * | 1/2005 | Kleiner | 709/224 |
| 6,873,617 B1 * | 3/2005 | Karras | 370/389 |
| 6,957,169 B1 * | 10/2005 | Van Horne | 702/182 |
| 6,985,453 B2 * | 1/2006 | Lundby et al. | 370/311 |
| 6,987,737 B2 * | 1/2006 | Castellano et al. | 370/248 |
| 7,016,325 B2 * | 3/2006 | Beasley et al. | 370/331 |
| 7,107,498 B1 * | 9/2006 | Schmidt et al. | 714/704 |
| 7,127,521 B2 * | 10/2006 | Hsu et al. | 709/233 |
| 7,194,281 B2 * | 3/2007 | Peng et al. | 455/522 |
| 7,286,511 B2 * | 10/2007 | Zhong et al. | 370/338 |
| 2001/0053699 A1 | 12/2001 | McCrady et al. | |
| 2002/0013856 A1 | 1/2002 | Garcia-Luna-Aceves | |
| 2002/0072384 A1 * | 6/2002 | Chheda | 455/522 |
| 2002/0101822 A1 | 8/2002 | Ayyagari et al. | |
| 2002/0110138 A1 * | 8/2002 | Schramm | 370/430 |
| 2003/0124977 A1 * | 7/2003 | Smith et al. | 455/16 |
| 2003/0161268 A1 | 8/2003 | Larsson et al. | |
| 2004/0032847 A1 | 2/2004 | Cain | |
| 2004/0057394 A1 * | 3/2004 | Holtzman | 370/317 |
| 2005/0068970 A1 * | 3/2005 | Srikrishna et al. | 370/400 |

FOREIGN PATENT DOCUMENTS

| | | |
|---|---|---|
| DE | 4437417 A1 * | 4/1995 |
| EP | 0513841 A2 | 11/1992 |
| EP | 0627827 A2 | 12/1994 |
| EP | 0924890 A2 | 6/1999 |
| FR | 2683326 | 7/1993 |
| WO | WO 9608884 | 3/1996 |
| WO | WO 9724005 | 7/1997 |
| WO | WO 9839936 | 9/1998 |
| WO | WO 9912302 | 3/1999 |
| WO | WO 0034932 | 6/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |

WO    WO 0235253    5/2002

OTHER PUBLICATIONS

Wong, et al., "Soft Handoffs in CDMA Mobile Systems," Dec. 1997, IEEE Personal Communications.

Wong et al., "A Pattern Recognition System for Handoff Algorithms," Jul. 2000, IEEE Journal on Selected Areas in Communications, vol. 18, No. 7.

Andras G. Valko, "Cellular IP: A New Approach to Internet Host Mobility," Jan. 1999, ACM Computer Communication Review.

Richard North, Dale Bryan and Dennis Baker, "Wireless Networked Radios: Comparison of Military, Commercial and R&D Protocols," Feb. 28-Mar. 3, 1999, $2^{nd}$ Annual UCSD Conference on Wireless Communications, San Diego, CA.

Benjamin B. Peterson, Chris Kmiecik, Richard Hartnett, Patrick M. Thompson, Jose Mendoza and Hung Nguyen, "Spread Spectrum Indoor Geolocation," Aug. 1998, Navigation: Journal of the Institute of Navigation, vol. 45, No. 2, Summer 1998.

Josh Broch, David A. Maltz, David B. Johnson, Yih-Chun Hu and Jorjeta Jetcheva, "A Performance Comparison of Multi-Hop Wireless Ad Hoc Network Routing Protocols," Oct. 25-30, 1998, Proceedings of the $4^{th}$ Annual ACM/IEEE International Conference on Mobile Computing and Networking.

C. David Young, "USAP: A Unifying Dynamic Distributed Multichannel TDMA Slot Assignment Protocol".

Chip Elliott and Bob Heile, "Self-Organizing, Self-Healing Wireless Networks," 2000 IEEE.

J.J. Garcia-Luna-Aceves and Asimakis Tzamaloukas, "Reversing the Collision-Avoidance Handshake in Wireless Networks".

J.J. Garcia-Luna-Aceves and Marcelo Spohn, "Transmission-Efficient Routing in Wireless Networks Using Link-State Information".

J.J. Garcia-Luna-Aceves and Ewerton L. Madruga, "The Core-Assisted Mesh Protocol," Aug. 1999, IEEE Journal on Selected Areas in Communications, vol. 17, No. 8.

Ad Kamerman and Guido Aben, "Net Throughput with IEEE 802.11 Wireless LANs".

J. R. McChesney and R.J. Saulitis, "Optimization of an Adaptive Link Control Protocol for Multimedia Packet Radio Networks".

Ram Ramanathan and Regina Rosales-Hain, "Topology Control of Multihop Wireless Networks Using Transmit Power Adjustment".

Ram Ramanathan and Martha E. Steenstrup, "Hierarchically-Organized, Multihop Mobile Wireless Networks for Quality-of-Service Support".

Martha E. Steenstrup, "Dynamic Multipoint Virtual Circuits for Multimedia Traffic in Multihop Mobile Wireless Networks".

Zhenya Tang and J.J. Garcia-Luna-Aceves, "Collision-Avoidance Transmission Scheduling for Ad-Hoc Networks".

George Vardakas and Wendell Kishaba, "QoS Networking With Adaptive Link Control and Tactical Multi-Channel Software Radios".

* cited by examiner

SYSTEM AND METHOD FOR CHARACTERIZING THE QUALITY OF A LINK IN A WIRELESS NETWORK

This application claims benefit under 35 U.S.C. § 119(e) from a U.S. Provisional Patent Application of Avinash Joshi et al. entitled "System and Method for Characterizing the Quality of a Link in a Wireless Network", Ser. No. 60/546,941, filed on Feb. 24, 2004, a U.S. Provisional Patent Application of Avinash Joshi entitled "System and Method to Improve the Network Performance of a Wireless Communication Network by Finding an Optimal Route Between a Source and a Destination", Ser. No. 60/476,237, filed on Jun. 6, 2003, and a U.S. Provisional Patent Application of Guénaëtl T. Strutt entitled "A System and Method for Providing a Measure of Link Reliability to a Routing Protocol in an Ad Hoc Wireless Network", Ser. No. 60/546,940, filed on Feb. 24, 2004, the entire contents of each being incorporated herein by reference.

CROSS-REFERENCE TO RELATED APPLICATION

Related subject matter is disclosed in U.S. patent application of Avinash Joshi entitled "System and Method for Achieving Continuous Connectivity to an Access Point or Gateway in a Wireless Network Following an On-Demand Routing Protocol, and to Perform Smooth Handoff of Mobile Terminals Between Fixed Terminals in the Network", Ser. No. 10/755,346, filed on Jan. 13, 2004, the entire content of which is incorporated herein by reference.

BACKGROUND OF THE INVENTION

1. Field of the Invention

The present invention relates to a system and method for characterizing the quality of a link between nodes in a wireless communication network, such as a wireless ad-hoc peer-to-peer network, with minimum network overhead. More particularly, the present invention relates to a system and method efficiently characterizing the bi-directionality of links between nodes in a wireless network, such as a wireless ad-hoc peer-to-peer network.

2. Description of the Related Art

Wireless communication networks, such as mobile wireless telephone networks, have become increasingly prevalent over the past decade. These wireless communications networks are commonly referred to as "cellular networks", because the network infrastructure is arranged to divide the service area into a plurality of regions called "cells". A terrestrial cellular network includes a plurality of interconnected base stations, or base nodes, that are distributed geographically at designated locations throughout the service area. Each base node includes one or more transceivers that are capable of transmitting and receiving electromagnetic signals, such as radio frequency (RF) communications signals, to and from mobile user nodes, such as wireless telephones, located within the coverage area. The communications signals include, for example, voice data that has been modulated according to a desired modulation technique and transmitted as data packets. As can be appreciated by one skilled in the art, network nodes transmit and receive data packet communications in a multiplexed format, such as time-division multiple access (TDMA) format, code-division multiple access (CDMA) format, or frequency-division multiple access (FDMA) format, which enables a single transceiver at a first node to communicate simultaneously with several other nodes in its coverage area.

In recent years, a type of mobile communications network known as an "ad-hoc" network has been developed. In this type of network, each mobile node is capable of operating as a base station or router for the other mobile nodes, thus eliminating the need for a fixed infrastructure of base stations. Details of an ad-hoc network are set forth in U.S. Pat. No. 5,943,322 to Mayor, the entire content of which is incorporated herein by reference.

More sophisticated ad-hoc networks are also being developed which, in addition to enabling mobile nodes to communicate with each other as in conventional ad-hoc networks, further enable the mobile nodes to access a fixed network and thus communicate with other types of user terminals, such as those on the public switched telephone network (PSTN), and on other networks such as the Internet. Details of these advanced types of ad-hoc networks are described in U.S. Pat. No. 7,072,650 entitled "Ad Hoc Peer-to-Peer Mobile Radio Access System Interfaced to the PSTN and Cellular Networks", issued on Jul. 4, 2006, in U.S. Pat. No. 6,807,165 entitled "Time Division Protocol for an Ad-Hoc, Peer-to-Peer Radio Network Having Coordinating Channel Access to Shared Parallel Data Channels with Separate Reservation Channel", issued on Oct. 19, 2004, and in U.S. Pat. No. 6,873,839 entitled "Prioritized-Routing for an Ad-Hoc, Peer-to-Peer, Mobile Radio Access System", issued on Mar. 29, 2005, the entire content of each being incorporated herein by reference.

As can be appreciated by one skilled in the art, since certain nodes of the ad-hoc network are mobile, it is necessary for the network to maintain connectivity with those nodes. Transmitted data packets typically "hop" from mobile device to mobile device, creating a transmission path, or route, until reaching a final destination. However, transmission paths between mobile devices are often subject to change as devices move, therefore ad-hoc network communication must be able to adapt to achieve optimum performance while addressing the limited capabilities and capacities of mobile individual devices. Hence, in order to be able to select optimum paths or links between nodes in order to maximize performance of the network, it is necessary for the network and nodes to be capable of assessing the quality of the links between nodes.

In a typical wireless network, the measurement of quality of link between two nodes A and B is done separately on both the nodes and the information is never exchanged between the nodes. This may result in a situation where node A interprets the link between itself (node A) and node B as having high quality, while node B might have a totally opposite view (i.e., node B may interpret the link between itself and node A as having poor quality), which may lead to inefficient routing as different nodes in the network can compute different routing metrics depending upon their connection with nodes A and B. An example of a technique for computing such routing metrics is described in a U.S. Provisional Patent Application Ser. No. 60/476,237 referenced above. Hence, since the traffic between nodes usually flows in both directions (e.g., in TCP or IEEE 802.11 MAC networks), it is always better for all nodes to have a uniform view of a link between nodes.

In a typical wireless network, the bi-directionality of a link between two nodes is tested in the following two ways:

Hello Messages

Initially, all nodes send hello messages at regular interval notifying their neighbors about their presence. The hello message contains the address of the sender and can have other information as can be appreciated by one skilled in the art. After receiving hello message from the neighbors, each node modifies its hello message to include the list of neighbors ("heard hello list") that it recently heard. When a node receives a hello message with its address in the "heard hello list", it determines that there is a bidirectional link between itself and the sender. Several variations to this approach are possible, such as sending only partial list of nodes that can be heard in place of sending the complete list as described, for example, in the RFC 3684 entitled "Topology Dissemination Based on Reverse-Path Forwarding (TBRPF) which can be found at http://www.ieff.org/rfc/rfc3684.txt, the entire content of which is incorporated herein by reference. Other variations would include indicating whether the link between the neighbor advertised is deemed bidirectional or unidirectional, using Routing Advertisements or Neighbor Advertisements in place of hello message, and so on.

Although this hello message technique can be somewhat effective, the technique suffers from the following disadvantages. First, the technique is slow, since it takes a 3-way handshake to determine the bi-directionality of a link. The technique is also inefficient, because sending the neighbor addresses in the hello message can consume a significant amount of bandwidth, especially in denser environments. Furthermore, the technique can be faulty, because receiving just a hello message is no indication of the quality of the link. In wireless channels, the reception of short, intermittent messages is no guarantee that the link can be used to effectively deliver traffic, which is comprised of longer packets sent at a higher rate.

Unicast Packet

In place of sending hello message periodically, each node can determine the bi-directionality of a link to a neighbor after receiving a response to a unicast message from the other node. The response can be of the form of a "Clear To Send" (CTS) after sending a "Request To Send" (RTS), or in the form of an Acknowledgement (ACK) after sending a data message. These responses are typical of CSMA/CA or 802.11 MAC protocols.

Although this technique also can be effective, the technique suffers from the following disadvantages. First, this is a reactive approach and makes it necessary for the nodes to send some unicast message before determining the bi-directionality. Also, the technique is faulty, because receiving just an ACK or CTS message is no indication of the quality of link. Again, in wireless channels, the reception of short, intermittent messages is no guarantee that the link can be used to effectively deliver traffic.

Accordingly, a need exists for an improved system and method for characterizing the quality of a link, in particular, a bi-directional link, between nodes in a wireless communication network, such as a wireless ad-hoc peer-to-peer network, with minimum network overhead.

SUMMARY OF THE INVENTION

An object of the present invention is to provide an improved system and method for characterizing the quality of a link, in particular, a bi-directional link, between nodes in a wireless communication network, such as a wireless ad-hoc peer-to-peer network, with minimum network overhead.

This and other objects are substantially achieved by a system and method for determining the quality of link between two nodes by taking into consideration the view from both the nodes, and factors such as signal strength, signal-to-noise ratio or any statistic collected at the physical layer that is deemed representative of the quality of a link. The link quality can also be a weighted average of the link qualities as they are measured by both nodes, the weights being determined by factors such as activity or traffic load.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
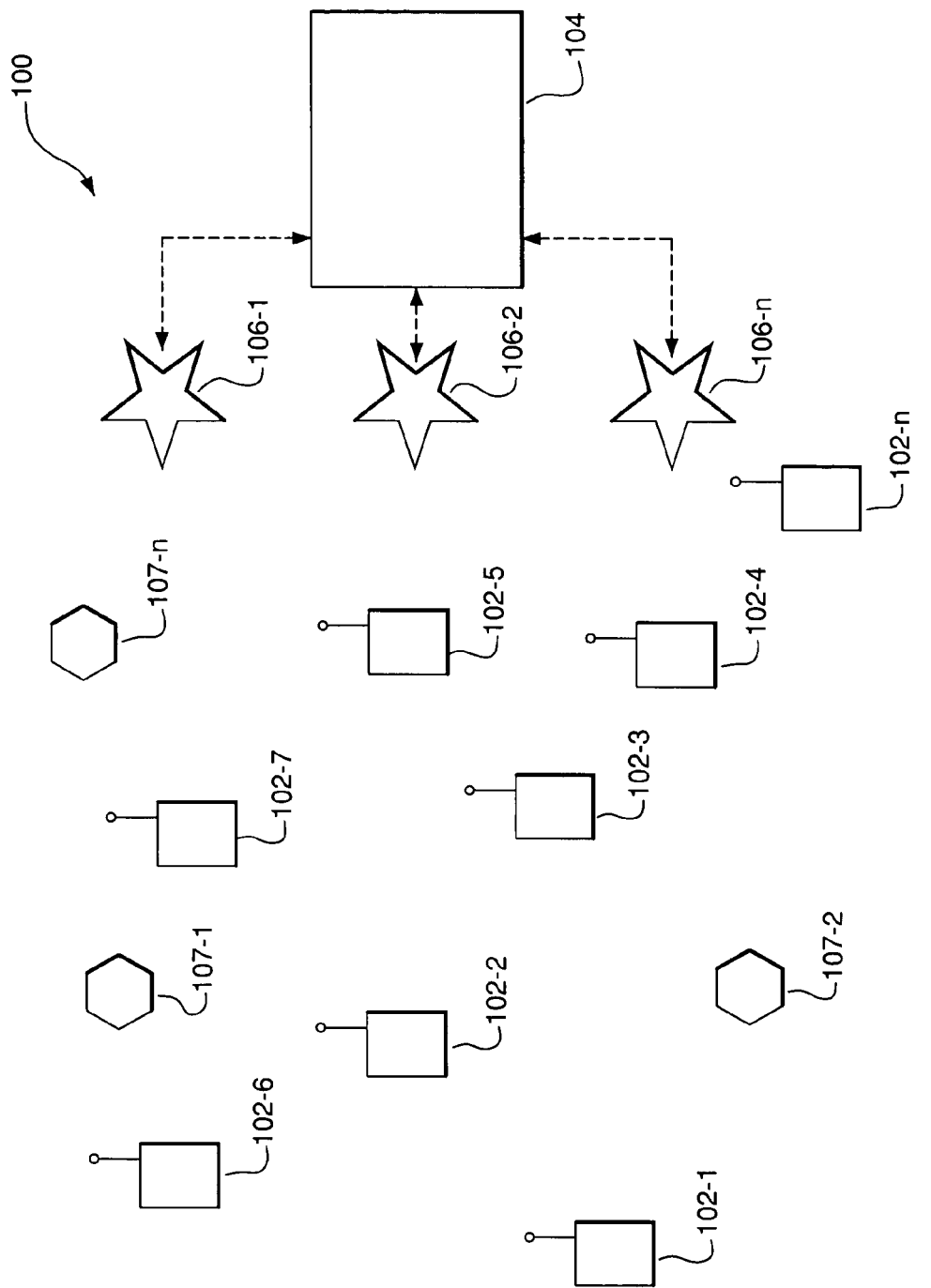
FIG. 1 is a block diagram of an example ad-hoc wireless communications network including a plurality of nodes employing a system and method in accordance with an embodiment of the present invention.

FIG. 1 is a block diagram illustrating an example of an ad-hoc packet-switched wireless communications network 100 employing an embodiment of the present invention. Specifically, the network 100 includes a plurality of mobile wireless user terminals 102-1 through 102-n (referred to generally as nodes 102 or mobile nodes 102), and can, but is not required to, include a fixed network 104 having a plurality of access points 106-1, 106-2, . . . 106-n (referred to generally as nodes 106 or access points 106), for providing nodes 102 with access to the fixed network 104. The fixed network 104 can include, for example, a core local access network (LAN), and a plurality of servers and gateway routers to provide network nodes with access to other networks, such as other ad-hoc networks, the public switched telephone network (PSTN) and the Internet. The network 100 further can include a plurality of fixed routers 107-1 through 107-n (referred to generally as nodes 107 or fixed routers 107) for routing data packets between other nodes 102, 106 or 107. It is noted that for purposes of this discussion, the nodes discussed above can be collectively referred to as "nodes 102, 106 and 107", or simply "nodes".

As can be appreciated by one skilled in the art, the nodes 102, 106 and 107 are capable of communicating with each other directly, or via one or more other nodes 102, 106 or 107 operating as a router or routers for packets being sent between nodes, as described in U.S. Pat. No. 5,943,322 to Mayor, and in U.S. patent application Ser. Nos. 09/897,790, 09/815,157 and 09/815,164, referenced above.

Figure 2:
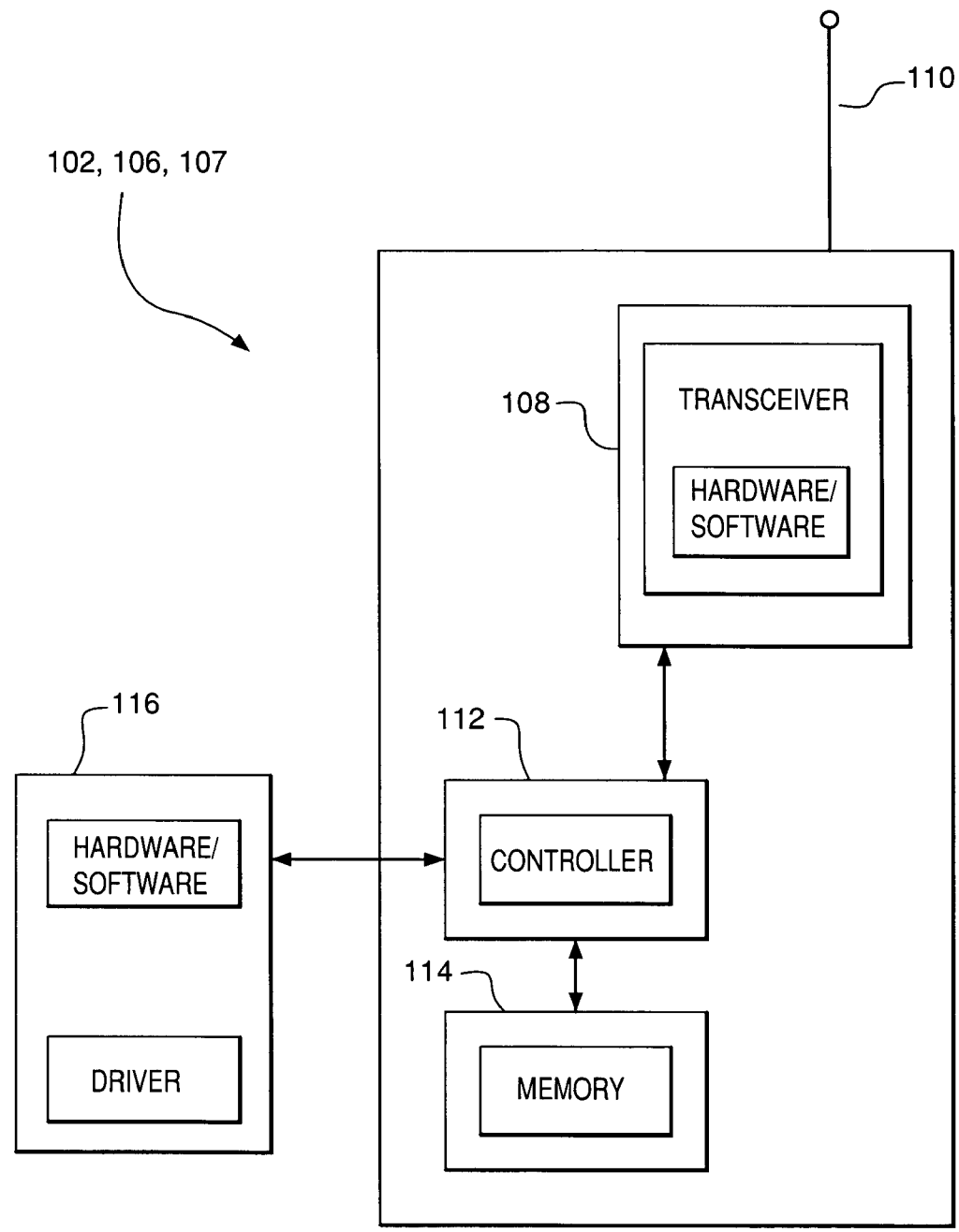
FIG. 2 is a block diagram illustrating an example of a mobile node employed in the network shown in FIG. 1.

As shown in FIG. 2, each node 102, 106 and 107 includes a transceiver, or modem 108, which is coupled to an antenna 110 and is capable of receiving and transmitting signals, such as packetized signals, to and from the node 102, 106 or 107, under the control of a controller 112. The packetized data signals can include, for example, voice, data or multimedia information, and packetized control signals, including node update information.

Each node 102, 106 and 107 further includes a memory 114, such as a random access memory (RAM) that is capable of storing, among other things, routing information pertaining to itself and other nodes in the network 100. As further shown in FIG. 2, certain nodes, especially mobile nodes 102, can include a host 116 which may consist of any number of devices, such as a notebook computer terminal, mobile telephone unit, mobile data unit, or any other suitable device.

Each node 102, 106 and 107 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included.

As will now be discussed, the system and method according to an embodiment of the present invention is capable of characterizing the quality of a link, in particular, a bi-directional link, in a wireless network, such as network 100 described above, with minimum network overhead. This system and method rely on the following two facts. First, as a link is defined between two unique nodes (e.g., nodes 102, 106 or 107), any characterization of the quality of link between two nodes should take into consideration the view from both the nodes. Similarly, any characterization of the bi-directionality of a link should take into consideration the view from both of the nodes. In addition, the quality of a link or its bi-directionality cannot be measured by just exchanging a few messages in both directions. Rather, the quality or the bi-directionality should take other factors into consideration as described in U.S. Provisional Patent Application entitled "A System and Method for Providing a Measure of Link Reliability to a Routing Protocol in an Ad Hoc Wireless Network", referenced above, and in published U.S. Patent Application No. 2003/0189906 entitled "System and Method for Providing Adaptive Control of Transmit Power and Data Rate in an Ad-Hoc Communication Network, Ser. No. 10/087,016, filed on Mar. 15, 2002, the entire contents being incorporated herein by reference.

Figure 3:
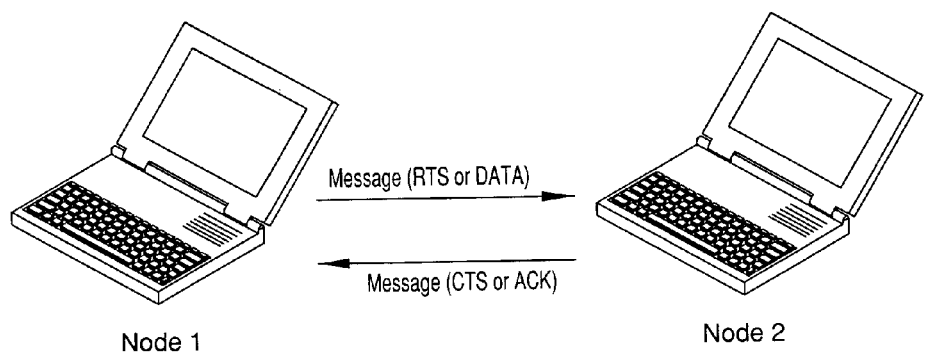
FIG. 3 is a block diagram of an example of two nodes in the network shown in FIG. 1 exchanging RTS, CTS, ACK and DATA messages.

For purposes of this discussion, two of the nodes in network 100 as shown in FIG. 3 as Node 1 and Node 2. During a typical communication, a certain amount of traffic is exchanged between Node 1 and Node 2. As described in the patent applications referenced above, the node which is sourcing the traffic is better positioned to make an accurate assessment of the quality of link. If no traffic is being transmitted by Node 2 to Node 1, Node 2 does not have efficient means of assessing the quality of the link (the reverse is also true). Therefore, Node 1 is the node which is better capable of making a proper assessment of the link quality. For Node 2 to have a proper assessment of the link quality, it must be informed of Node 1's own assessment. This is substantially performed by inserting a Link Quality field in the traffic sent by Node 1. The impact of this overhead on overall performance is insignificant due to the small size of the information being sent (e.g., on the order of one byte of information per data packet). The Link Quality field can be inserted in the actual data message sent from Node 1 to Node 2, or it can be inserted in the RTS/CTS messages (if there are any), which is a preferred implementation for reasons explained below in the "RTS-CTS Implementation" section.

Once the Link Quality field has been received by Node 2, it first verifies whether its own LQ value ($LQ_{old}$) is higher than the one it has received ($L_{Qrec}$). If this is the case, it performs the following calculation:

$$LQ_{new} = \frac{\alpha \cdot LQ_{old} + \beta \cdot LQ_{rec}}{\alpha + \beta}$$

Otherwise—if its own LQ value ($LQ_{old}$) is lower than the one it has received ($LQ_{rec}$), it does not do anything.

The parameters $\alpha$ and $\beta$ reflect the weights the system designer wants to apply to the measurement that is performed locally and the one that has been provided by the other node. Values of $\alpha=1$ and $\beta=1$ (which means that the new Link Quality is simply the average of the previous local Link Quality and the value that is received) are recommended for their simplicity and the fast convergence rate of the algorithm. $\alpha$ and $\beta$ can be judiciously selected in such a way that it is representative of the amount of traffic that is being sent by each node: cc will be set to a low value if the traffic sent from Node 2 to Node 1 is low (which is the assumption made in this example) and $\beta$ will be set to a high value since the traffic sent from Node 1 to Node 2 is high (which is the assumption made in this example). Thus the resulting link quality estimation that is performed by Node 2 will converge at a rate which is proportional to the amount of traffic that originates from the Node 1.

Figure 4:
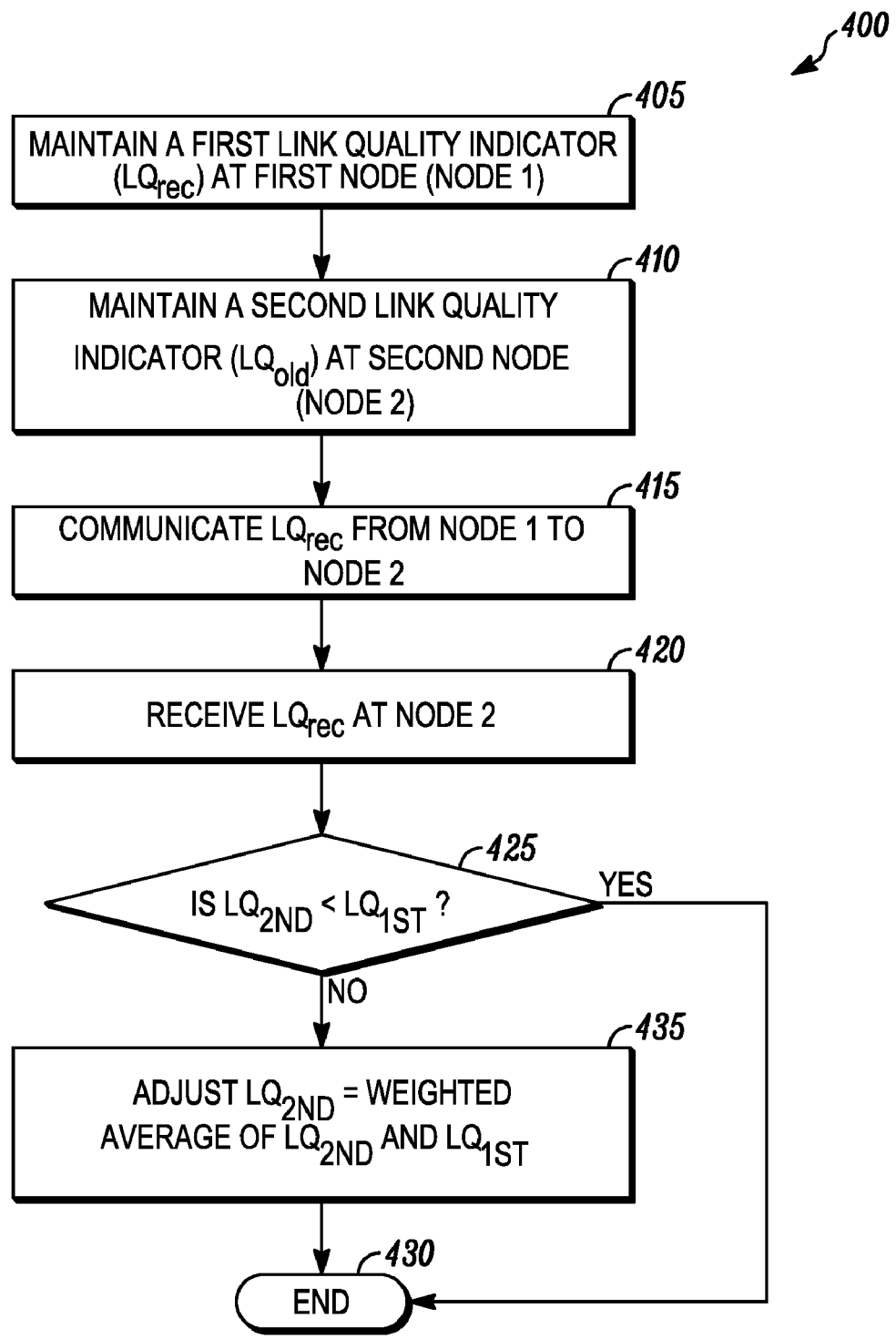
FIG. 4 is a flowchart illustrating a method for calculating a link quality indicator of a link between a first node and a second node in the ad-hoc wireless communication network of FIG. 1.

While the example used shows traffic flowing from Node 1 to Node 2, the algorithm applies to every single node in the network 100. Now referring to FIG. 4, a flowchart illustrating a method 400 for calculating a link quality indicator of a link between a first node (Node 1) and a second node (Node 2) in a multi-hopping wireless communication network is shown. The method 400 begins when the first node (Node 1) assesses the quality of the link based on one or more assessed physical layer conditions. At Step 405 the first node (Node 1) maintains a first link quality indicator ($LQ_{rec}$) at the first node using the assessed quality of the link. As shown in step 410 the second node (Node 2) maintains a second link quality indicator ($LQ_{old}$) based on the assessed quality of the link. Next in step 415 the first node communicates a link quality field including the first link quality indicator ($LQ_{rec}$) to the second node. At step 420, the second node receives the link quality field including the first link quality indicator ($LQ_{rec}$) and verifies at step 425 to determine whether its own LQ value ($LQ_{2nd}$) is lower than the one it has received ($LQ_{1st}$). If the second link quality indicator is lower than the received first link quality indicator then the second node does not do anything (step 430). If the second link quality indicator is higher than the first link quality indicator then at step 435, the second node adjusts the second link quality indicator such that the adjusted link quality indicator ($LQ_{new}$) is the weighted average of the second link quality indicator and the received first link quality indicator. The results achieved by employing the system and method according to the embodiment of invention in a wireless network are as follows.

If the link between Node 1 and Node 2 is used in a purely unidirectional manner (e.g., the traffic flows from Node 1 to Node 2), the algorithm simply informs Node 2 of the quality of the link as seen from Node 1. If the link between Node 1 and Node 2 is used in a bi-directional manner, the algorithm will provide each node with a view of the lowest Link Quality measurement performed by each node, with the rate of convergence being dependent on the $\alpha$ and $\beta$ weights discussed above. In other words, the Link Quality will converge towards the equation:

$$LQ_{1 \leftrightarrow 2} = \min(LQ_{1 \to 2}, LQ_{2 \to 1})$$

In many realistic implementations of a wireless network, the traffic is only partially directional, that is, most of the traffic on a link flows from one node to the other (e.g., from Node 1 to Node 2), but there is still a limited amount of traffic flowing from Node 2 to Node 1 (either in the form of traffic acknowledgement or routing overhead). If, for whatever reason, Node 2 must provide an estimation of the Link Quality between Node 1 and Node 2 (e.g. for the establishment of a route), it can now do so without entirely relying on an estimation based on "return traffic" alone. Otherwise Node 2 would have had to use a default value which is not representative of the actual link quality, since the limited amount of return traffic is not necessarily enough to provide a proper estimation of the link quality.

One aim of a wireless network designer is to ensure that all links are bi-directional. Due to the nature of the wireless communication channels, links are never totally unidirectional or bi-directional. When a link is said to be "bi-directional", it means that the worst of each direction's link quality metric is above a certain threshold. When a link is said to be "unidirectional" it means that one of the direction's link quality metric is above a certain threshold, while the other direction's link quality metric is below that same threshold.

The embodiment of the present invention ensures that all active links are bi-directional because each node is provided with an assessment of the link quality from the neighbor's point of view. Therefore, if the link quality value is above a certain threshold, it typically means the link is bi-directional. Some examples of possible implementation are given below.

RTS-CTS Implementation

In this implementation, the quality of link as seen (or computed) by the node is quantized into some fixed length field (for example, 8 bits) and then sent as an additional field in the RTS-CTS messages used by the MAC protocol. RTS and CTS messages are short packets and are usually sent at lower data rates, and are therefore more likely to be received than data packets which are generally larger in size and are sent at higher data rates. Thus, the information about the link quality is more likely to be exchanged if sent on an RTS-CTS message. This implementation may not be possible if the MAC layer is a standard based protocol (such as 802.11) or if the number of bits in these messages is fixed. This method has a limited impact on system performance since the size of the link quality field (8 bits) is reasonable compared to the length of RTS-CTS messages (which typically contains more than a hundred bits of information).

Payload Implementation

If the RTS-CTS implementation is not possible, then the link metrics can also be exchanged by adding the quantized link quality in the payload. The field can be added to the data portion of the packet or to MAC header itself so that it goes with all the data and ACK packets. The lower success rate of the data packet is largely compensated by the fast convergence of the algorithm. Hence, it is not critical to exchange link quality information after each unsuccessful transmission. This implementation may appear problematic in cases where not a single packet is deliverable, that is, no link quality information can be exchanged. However, most routing protocols require some form of acknowledgement which, if successfully transferred, would indicate the poor success rate of the link in question inside the payload.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method for characterizing the quality of a link in a multi-hopping wireless communication network, the method comprising:
  calculating a link quality indicator of a link between a first node and a second node in the multi-hopping wireless communication network by:
    maintaining a first link quality indicator at the first node using an assessed quality of the link;
    maintaining a second link quality indicator at the second node using the assessed quality of the link;
    converging the first link quality indicator and the second link quality indicator to calculate the link quality indicator for the link and thereby establish a symmetric view of the link quality at the first node and the second node located on each side of the link by:
      communicating the first link quality indicator from the first node to the second node;
      comparing the first link quality indicator and the second link quality indicator by the second node;
      maintaining the second link quality indicator at the second node when the second link quality indicator is lower than the received first link quality indicator; and
      adjusting the second link quality indicator at the second node when the second link quality indicator is higher than the received first link quality indicator, wherein the adjusting comprises calculating an adjusted link quality indicator as a weighted average of the second link quality indicator and the received first link quality indicator;
    communicating the adjusted link quality indicator from the second node to the first node; and
  re-adjusting at the first node, the first link quality indicator of the link using the received adjusted link quality indicator.

2. A method as claimed in claim 1, wherein:
the assessed quality of the link is based on one or more assessed physical layer conditions selected from a group comprising signal strength, a signal-to-noise ratio, and a data rate.

3. A method as claimed in claim 1, wherein:
the adjusted link quality indicator converges toward the lowest of the link quality indicators that are determined by the respective first and second nodes.

4. A method as claimed in claim 1, wherein:
determining whether the link between the first and second nodes is bidirectional using the adjusted link quality indicator.

5. A method as claimed in claim 1, further comprising:
calculating at the second node a weighted average of the received first link quality indicator and a locally calculated link quality, and wherein the adjusting the second link quality indicator utilizes the second node weighted average; and
calculating at the first node a weighted average of the received adjusted link quality indicator and the first link quality indicator, and wherein the re-adjusting the first link quality indicator uses the first node weighted average.

6. A multi-hopping wireless communication network for characterizing the quality of a link in the multi-hopping wireless communication network, comprising:
  a first node that comprises means to calculate the quality of the link in the multi-hopping wireless communication network;
  a second node communicatively coupled to the first node through the link;
  wherein the first node comprises means to:
    maintain a link quality indicator using an assessed quality of the link, and
    communicated the link quality indicator to the second node, and further wherein the second node comprises means to:
    calculate a locally calculated link quality indicator; and to converge the received link quality indicator and the locally calculated link quality indicator to calculate the link quality indicator for the link and thereby establish a symmetric view of the link quality at the first node and the second node located on each side of the link by:

comparing the received link quality indicator and the locally calculated link quality indicator;

maintaining the locally calculated link quality indicator when the locally calculated link quality indicator is less than the received link quality indicator; and when the locally calculated link quality indicator is greater than the received link quality indicator, calculating an adjusted link quality indicator comprising a weighted average of the locally calculated link quality indicator and the received link quality indicator;

to communicate the adjusted link quality indicator to the first node; and wherein the first node comprises means to re-adjust the first link quality indicator of the link using the received adjusted link quality indicator.

7. A multi-hopping wireless communication network as claimed in claim 6, wherein:

the assessed quality of the link is based on one or more assessed physical layer conditions selected from a group comprising signal strength, a signal-to-noise ratio, and a data rate.

8. A multi-hopping wireless communication network as claimed in claim 6, wherein:

the adjusted link quality indicator converges toward the lowest of the link quality indicators that are determined by the respective first and second nodes.

9. A multi-hopping wireless communication network as claimed in claim 6, wherein:

the adjusted link quality indicator is used to determine whether the link between the first and second nodes is bidirectional.

10. A multi-hopping wireless communication network as claimed in claim 6, wherein:

the second node further comprises means to calculate a weighted average of the received first link quality indicator and the locally calculated link quality, and wherein the adjusting the stored link quality indicator utilizes the second node weighted average; and wherein the first node further comprises means to calculate a weighted average of the received adjusted link quality indicator and the assessed link quality, and means to re-adjust the link quality indicator using the first node weighted average.

* * * * *

UNITED STATES PATENT AND TRADEMARK OFFICE
CERTIFICATE OF CORRECTION

| | | |
|---|---|---|
| PATENT NO. | : 7,558,818 B2 | Page 1 of 1 |
| APPLICATION NO. | : 10/863534 | |
| DATED | : July 7, 2009 | |
| INVENTOR(S) | : Joshi et al. | |

It is certified that error appears in the above-identified patent and that said Letters Patent is hereby corrected as shown below:

IN THE SPECIFICATION

In Column 1, Lines 14-15, delete "Guénaëtl" and insert -- Guénaël --, therefor.

In Column 3, Line 8, delete "htlp://www.ieff.org/rfc/rfc3684.txt," and insert -- http://www.ietf.org/rfc/rfc3684.txt, --, therefor.

In Column 6, Line 8, delete "cc" and insert -- α --, therefor.

IN THE CLAIMS

In Column 8, Line 31, in Claim 2, after "comprising" insert -- a --.

In Column 10, Line 3, in Claim 12, after "comprising" insert -- a --.

Signed and Sealed this
Fourth Day of October, 2011

David J. Kappos
*Director of the United States Patent and Trademark Office*